(12) United States Patent
Zhu

(10) Patent No.: US 12,122,080 B2
(45) Date of Patent: Oct. 22, 2024

(54) PLASTIC FAUCET BODY AND A DIE FOR MOLDING THE SAME

(71) Applicants: Xiamen Lota International Co., Ltd., Fujian (CN); Lota Xiamen Industry Co., Ltd., Fujian (CN)

(72) Inventor: Chuanbao Zhu, Fujian (CN)

(*) Notice: Subject to any disclaimer, the term of this patent is extended or adjusted under 35 U.S.C. 154(b) by 67 days.

(21) Appl. No.: 17/981,949

(22) Filed: Nov. 7, 2022

(65) Prior Publication Data

US 2023/0060483 A1 Mar. 2, 2023

Related U.S. Application Data

(62) Division of application No. 16/619,417, filed as application No. PCT/CN2018/110597 on Oct. 17, 2018, now Pat. No. 11,524,436.

(30) Foreign Application Priority Data

Oct. 17, 2017 (CN) .......................... 201721335945.4
Nov. 2, 2017 (CN) ......................... 201711061574.X

(51) Int. Cl.
*B29C 45/33* (2006.01)
*B29C 45/40* (2006.01)
(Continued)

(52) U.S. Cl.
CPC ........ *B29C 45/332* (2013.01); *B29C 45/4005* (2013.01); *B29C 33/76* (2013.01);
(Continued)

(58) Field of Classification Search
CPC ... B29C 45/332; B29C 45/4005; B29C 33/76; B29C 45/32; B29C 2045/363;
(Continued)

(56) References Cited

U.S. PATENT DOCUMENTS 3,229,710 A * 1/1966 Keller, III ........... F16K 27/0263
251/360
4,103,709 A * 8/1978 Fischer ................. F16K 11/078
137/359

(Continued)

FOREIGN PATENT DOCUMENTS

CN 201487342 U 5/2010
CN 106273270 A 1/2017
(Continued)

OTHER PUBLICATIONS

International Search Report and Written Opinion Application No. PCT/CN2018/110597, dated Dec. 12, 2018, 4 pages.

*Primary Examiner* — John Bastianelli
(74) *Attorney, Agent, or Firm* — Zhong Law, LLC

(57) ABSTRACT

A plastic faucet body and a die for molding the same are provided. The plastic faucet body comprises a left water inlet pipe and a right water inlet pipe, where a connecting cross-beam is disposed between the left water inlet pipe and the right water inlet pipe, the left water inlet pipe and the right water inlet pipe are embedded with a threaded copper pipe, respectively, the copper pipes are formed integrally with the plastic faucet body by means of a single stage process and are in communication with the corresponding left water inlet pipe and the right water inlet pipe, respectively.

3 Claims, 5 Drawing Sheets

(51) Int. Cl.
*B29C 33/76* (2006.01)
*B29C 45/32* (2006.01)
*B29C 45/36* (2006.01)
*F16K 27/00* (2006.01)

(52) U.S. Cl.
CPC ........ *B29C 45/32* (2013.01); *B29C 2045/363* (2013.01); *F16K 27/00* (2013.01)

(58) Field of Classification Search
CPC .............. B29C 45/36; B29C 45/14598; B29C 45/14336; F16K 27/00; B29K 2705/10; E03C 1/04; Y10T 137/9464
USPC ......................................................... 137/801
See application file for complete search history.

(56) References Cited

U.S. PATENT DOCUMENTS

| | | | | |
|---|---|---|---|---|
| 6,623,045 B2* | 9/2003 | Wurgler | ................ | E03C 1/0404 285/133.11 |
| 8,302,620 B2* | 11/2012 | Lin | ........................ | E03C 1/04 285/376 |
| 8,651,132 B1* | 2/2014 | Hu | ........................ | E03C 1/0403 137/315.12 |
| 8,684,025 B2* | 4/2014 | Dai | ........................ | F16K 19/006 4/678 |
| 9,428,891 B2* | 8/2016 | Tzeng | .................... | E03C 1/0403 |
| 11,193,257 B2* | 12/2021 | Chen | ..................... | E03C 1/0404 |
| 2010/0096034 A1* | 4/2010 | Hou | ........................ | F16K 19/006 264/255 |
| 2012/0056351 A1 | 3/2012 | Xu | | |
| 2012/0067978 A1* | 3/2012 | Leichty | ................. | E03C 1/0403 239/417.5 |
| 2012/0097276 A1* | 4/2012 | Tzeng | .................... | F16K 19/006 137/603 |
| 2012/0186679 A1* | 7/2012 | Tarng | .................. | F16K 27/0263 137/801 |
| 2013/0019976 A1* | 1/2013 | Wu | ........................ | F16K 19/006 137/801 |
| 2019/0226186 A1 | 7/2019 | Park | | |

FOREIGN PATENT DOCUMENTS

| | | |
|---|---|---|
| CN | 106426736 A | 2/2017 |
| CN | 107631069 A | 1/2018 |
| CN | 107676517 A | 2/2018 |
| DE | 2364827 A1 | 1/1975 |

* cited by examiner

PLASTIC FAUCET BODY AND A DIE FOR MOLDING THE SAME

CROSS-REFERENCE TO RELATED APPLICATION

This application is a divisional application of U.S. patent application Ser. No. 16/619,417, filed Dec. 4, 2019, which is the U.S. National Phase under 35 U.S.C. § 371 of International Application PCT/CN2018/110597, filed Oct. 17, 2018, which claims priority to Chinese Patent Application No. 201721335945.4, filed Oct. 17, 2017 and Chinese Patent Application No. 201711061574.X, filed Nov. 2, 2017. The disclosures of the above-described applications are hereby incorporated by reference in their entirety.

TECHNICAL FIELD

The invention belongs to the technical field of mechanic, and particularly relates to a plastic faucet body and a die for molding the same.

BACKGROUND ART

The existing faucet body is generally H-shaped and comprises a left valve seat part, a right valve seat part, and a connecting part located between the valve seat parts; an installation containing slot is formed in each of the valve seat part and can be used for respectively installing a valve body, and each opposite valve body can be rotationally controlled by a handle; a central flow channel is formed in the connecting part, and two ends of the central flow channel are respectively communicated with an installation containing slot in the valve seat part, at least one water outlet is disposed in the middle of the central flow channel and communicated with the central flow channel, and the water outlet can be used for connecting water outlet members such as a water outlet pipe of a faucet or a shower head; at present, the faucet body structure is universally formed by integrally casting metal copper, but there are disadvantages that the process is complicated, sealing is poor and cost is high.

In order to overcome the defects of the metal faucet, a secondary injection molding process is adopted in the prior art, but the secondary injection molding has a problem of leakage of an injection molding joint surface, as shown in FIG. 1 of the invention with the publication number of CN201475461U discloses an injection molding structure of a faucet inner core body, wherein a cold water inlet pipe and a hot water inlet pipe are provided on an integrally molded water channel main body of the injection molding structure, and the cold water inlet pipe and the hot water inlet pipe are respectively provided with a cold water inlet channel and a hot water inlet channel, and a cross-beam is connected between the channels, another side core-pulling channel communicated with the cold water inlet channel, another side core-pulling channel communicated with the hot water inlet channel, and a water outlet are provided on the cross-beam. The side core-pulling channel communicated with the cold water inlet channel, the side core-pulling channel communicated with the hot water inlet channel and the water outlet form an integrated water channel main body which is three-way inside, side core-pulling holes in the integrated water channel main body are provided with sealing plugs for seal. However, the faucet inner core body of the above-mentioned patent comprises an integrally-molded water channel body and a secondary injection molding wrapping part, two times of injection molding are required, and sealing elements such as sealing plugs for seal and the like need to be assembled during the interval between two injection molding process flows.

SUMMARY OF THE INVENTION

The invention aims at: in order to simplify the process flow, reduce the secondary molding wrapping, facilitate the one-mold multi-cavity production, reduce the cost and improve the production efficiency, the invention provides a novel plastic faucet body formed by one-time integral injection molding and a molding tool thereof.

The technical solution adopted by the invention is as follows:

The plastic faucet body comprises a left water inlet pipe and a right water inlet pipe, wherein a connecting cross-beam is disposed between the left water inlet pipe and the right water inlet pipe, a water outlet is disposed in the middle of the connecting cross-beam, a left water inlet channel is disposed in a left cross-beam, the left water inlet channel is communicated with the left water pipe, a right water inlet channel is disposed in a right cross-beam, the right water inlet channel is communicated with the right water inlet pipe, and the left water inlet channel and the right water inlet channel are communicated with the water outlet, an another end of the left cross-beam is provided with a left core-pulling channel communicated with the left water inlet channel, another end of the right cross-beam is provided with a right core-pulling channel communicated with the right water inlet channel, and the axes of the left water inlet channel and the right water inlet channel are parallel; each of the left water inlet pipe and the right water inlet pipe is connected with a copper pipe; and the copper pipes are respectively communicated with the corresponding left water inlet pipe and the right water inlet pipe.

Further, a distance between each end face of the left core-pulling channel and the right core-pulling channel and the axis of the water outlet are equal to the outer diameter of the water outlet.

Further, the left water inlet channel is parallel to the axis of the right water inlet channel.

Further, each of the left core-pulling channel and the right core-pulling channel is provided with a sealing plug and a sealing ring.

Further, the axes of the right water inlet pipe, the left water inlet pipe and the water outlet are parallel.

Further, an angle between the axis of the water outlet and a plane where the axes of the left water inlet pipe and the right water inlet pipe are located is 45°.

A die for molding a plastic faucet body comprises a fixed mold, a movable mold and a mold-core installing seat, wherein the mold-core installing seat is provided with a left water inlet mold core, a right water inlet mold core and a water outlet mold core; a working surface of the fixed mold is provided with a first injection molding cavity, a working surface of the movable mold is provided with a second injection molding cavity, and the first injection molding cavity and the second injection molding cavity cooperate to form an injection molding cavity; the injection molding cavity comprises a flow passage and a product molding cavity; a mold core of the mold-core installing seat is provided within a cavity corresponding to the product molding cavity, the second injection molding cavity is provided with a right side core-pulling hole, the right side core-pulling hole is provided with a left water inlet channel core-pulling rod, the first injection molding cavity is provided with a left side core-pulling hole, and the left side core-pulling hole is provided with a right water inlet channel core-pulling rod.

Further, a plurality of fixed molds and a plurality of movable molds are provided, and the plurality of fixed molds and the plurality of movable molds are provided at intervals in a horizontal plane.

Further, each of the fixed mold and the movable mold is provided with two working surfaces, wherein one working surface is provided with a first injection molding cavity, and another working surface is provided with a second injection molding cavity.

In summary, with the technical solution adopted, the invention has the beneficial effects that:
1. According to the invention, the copper pipes and the faucet water channel body are subjected to one-step injection molding, so that the assembly processes of secondary molding wrapping and related bulk parts are eliminated, the cost is reduced, and the production efficiency is greatly improved.
2. According to the sealing method disclosed by the invention, a sealing plug and a sealing ring are adopted, so that the overall sealing performance is improved.
3. According to the novel plastic faucet body as proposed by present invention, the core-pulling mode of the novel plastic faucet body is z-shaped offset core-pulling, and the fixed mold and the movable mold can be disposed at intervals, namely one-mold multi-cavity production, so that the production efficiency is further improved.

Figure 1:
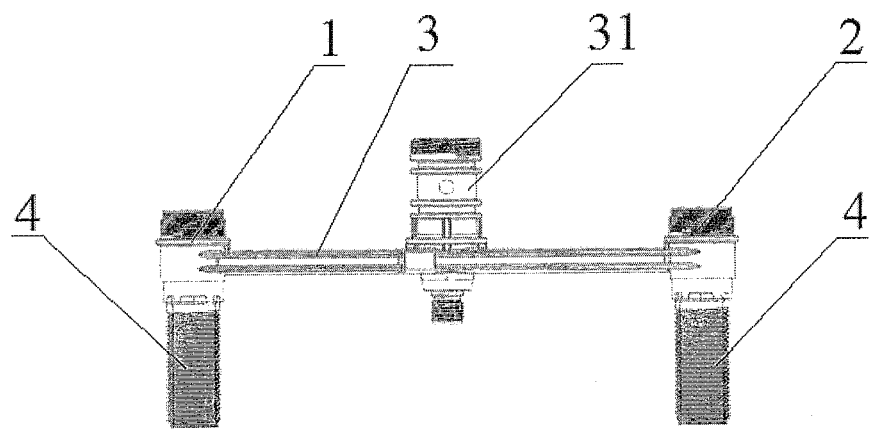
FIG. 1 is a front view of the present invention.
Figure 2:
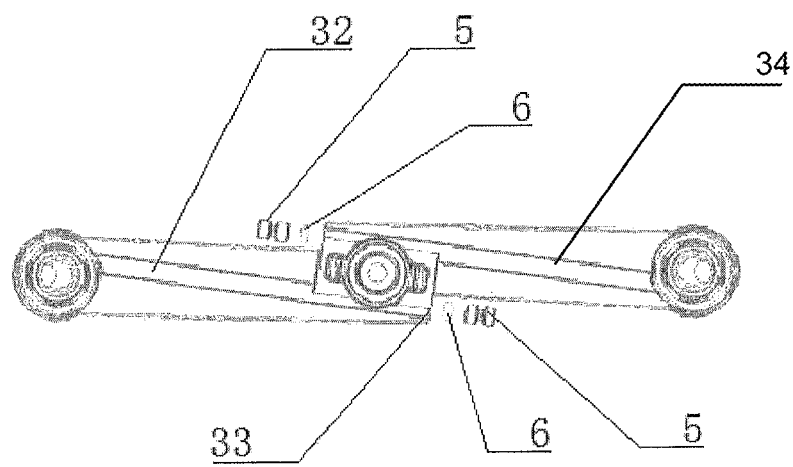
FIG. 2 is a schematic structural view of the present invention.
Figure 3:
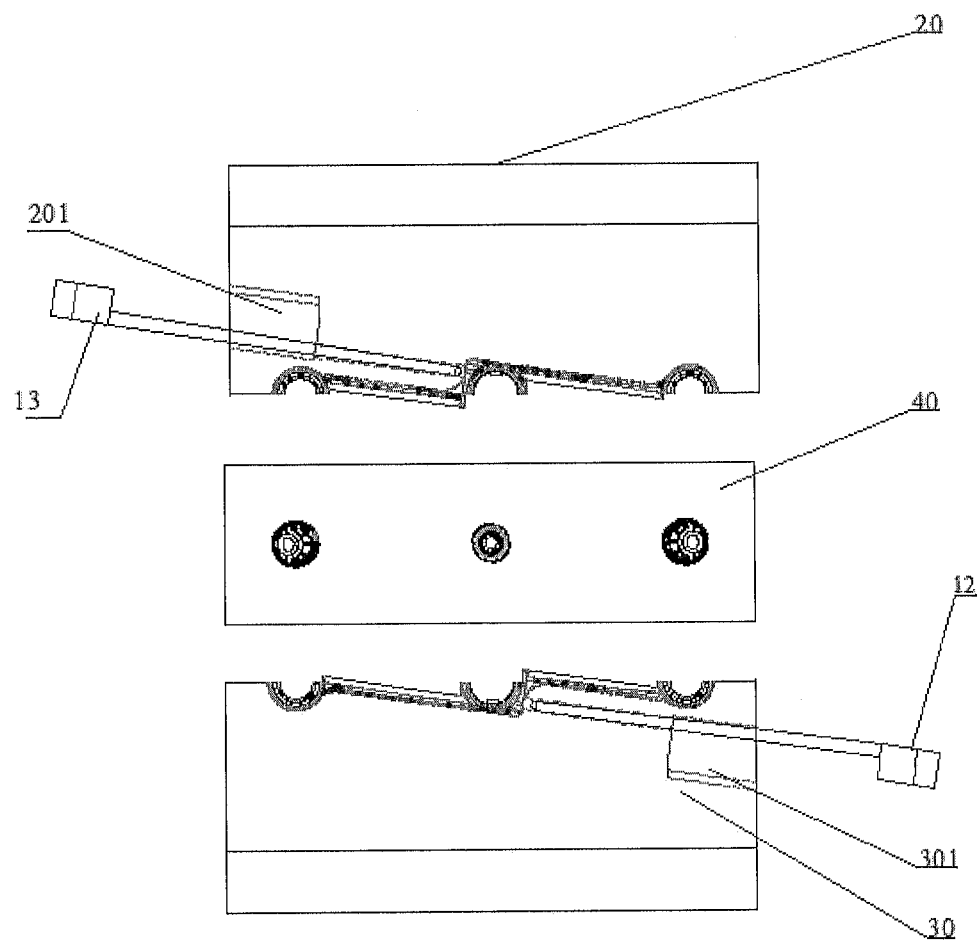
FIG. 3 is a schematic view of a die for molding according to the present invention.
Figure 4:
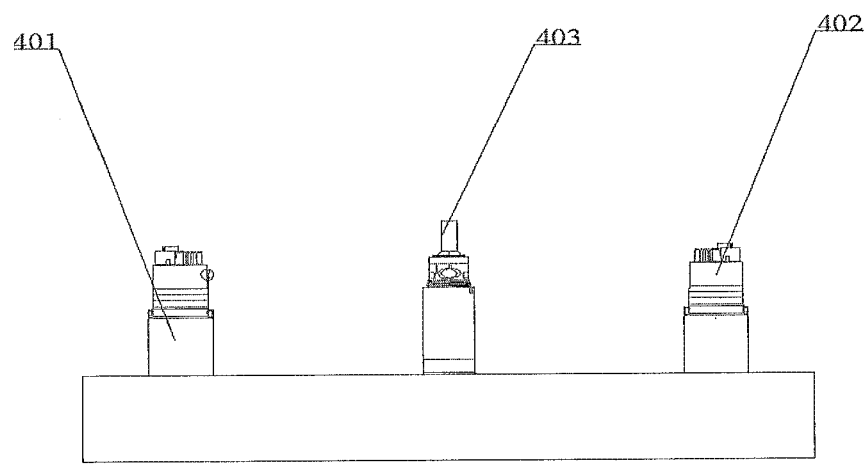
FIG. 4 is a schematic view of the mold-core installing seat of the present invention.
Figure 5:
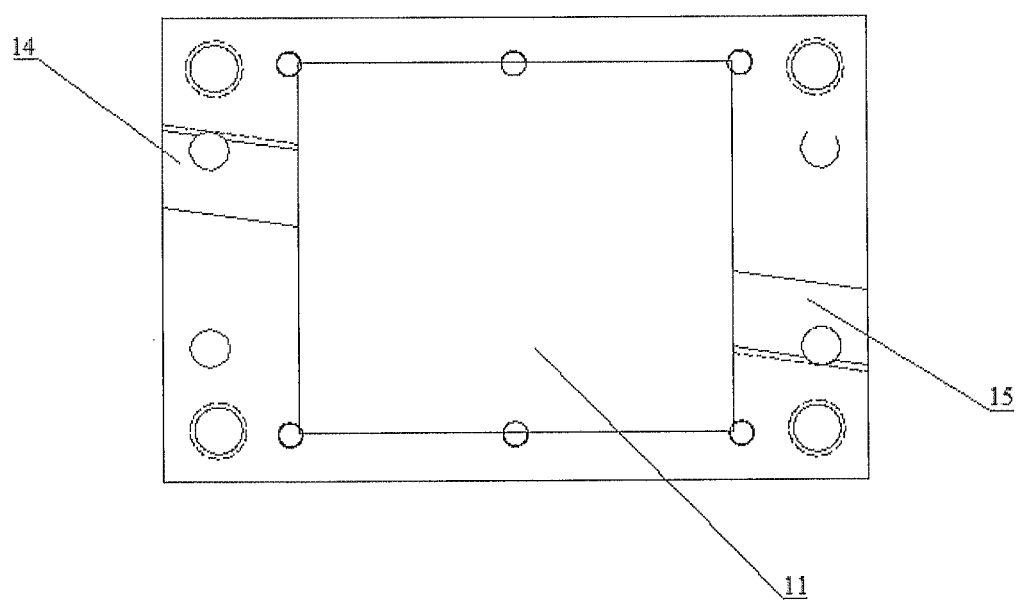
FIG. 5 is a top view of the base of die for molding of the present invention.

Reference numerals corresponding to the reference elements in the figures: 1-left water inlet pipe, 2-right water inlet pipe, 3-connecting cross-beam, 31-water outlet, 32-left water inlet channel, 33-left core-pulling channel, 4-copper pipe, 5-sealing plug, 6-sealing ring, 11-die movable slot, 12-left water inlet channel core-pulling rod, 13-right water inlet channel core-pulling rod, 14-left side core-pulling channel, 34-right water inlet channel, 15-right side core-pulling channel, 20-fixed mold, 201-left side core-pulling hole 30-movable mold, 301-right side core-pulling hole, 40-mold-core installing seat, 401-left water inlet mold core, 402-right water inlet mold core, 403-water outlet mold core

DETAILED DESCRIPTION OF THE INVENTION

In order to make the objects, technical solutions, and advantages of the present invention be more apparent, the present invention will be described in further detail with reference to the accompanying drawings and examples. It should be understood that the specific embodiments described herein are merely illustrative of the invention and are not intended to be limiting thereof. A novel plastic faucet body comprises a left water inlet pipe 1 and a right water inlet pipe 2, wherein a connecting cross-beam 3 is disposed between the left water inlet pipe 1 and the right water inlet pipe 2, the connecting cross-beam 3 is z-shaped, a water outlet 31 is disposed in the middle of the connecting cross-beam 3, a left water inlet channel 32 is disposed in the left cross-beam of the connecting cross-beam 3, and the left water inlet channel 32 is communicated with the left water pipe 1, a right water inlet channel is internally disposed in the right cross-beam of the connecting cross-beam 3, the right water inlet channel is communicated with the right water inlet pipe 2, the left water inlet channel 32 and the right water inlet channel are communicated with the water outlet 31, another end of the left cross-beam is provided with a left core-pulling channel 33 communicated with the left water inlet channel 32, and another end of the right cross-beam is provided with a right core-pulling channel communicated with the right water inlet channel, the left and right water inlet pipes are embedded with two copper pipes 4 with threads, and the copper pipes 4 are integrally-molded with the novel plastic faucet body; and the copper pipes 4 are respectively communicated with the corresponding left water inlet pipe 1 and the corresponding right water inlet pipe 2.

Further, a distance between each end face of the left core-pulling channel 33 and the right core-pulling channel and the axis of the water outlet are equal to the outer diameter of the water outlet.

Further, the axes of the left water inlet channel 32 and the right water inlet channel are parallel; Further, each of the left core-pulling channel and the right core-pulling channel is provided with a sealing plug 5 and a sealing ring 6.

Further, each of the right water inlet pipe 1 and the left water inlet pipe 2 is parallel to the axis of the water outlet 31.

Further, an angle between the axis of the outlet 31 and a plane in which the axes of the left and right inlet pipes lie is 45°.

A die for molding a novel plastic faucet body comprises a die base, a fixed mold 20, a movable mold 30 and a mold-core installing seat 40, wherein the fixed mold 20, the movable mold 30 and the mold-core installing seat 40 are all disposed in a movable slot 11 of the die base, and the mold-core installing seat 40 is provided with a left water inlet mold core 401, a right water inlet mold core 402 and a water outlet mold core 403, respectively. A working surface of the fixed mold 20 is provided with a first injection molding cavity, and a working surface of the movable mold 30 is provided with a second injection molding cavity, and the first injection molding cavity and the second injection molding cavity cooperate to form an injection molding cavity, wherein the injection molding cavity comprises a flow passage and a product molding cavity, the left water inlet core 401, the right water inlet core 402 and the water outlet core 403 of the core installing seat 40 are provided within a cavity corresponding to the product molding cavity, the second injection molding cavity is provided with a right side core-pulling hole 301, and the right side core-pulling hole 301 is provided with a left water inlet channel core-pulling rod 12, and the first injection molding cavity is provided with a left side core-pulling hole 201; the left side core-pulling hole 201 is provided with a right water inlet channel core-pulling rod 13, the molding tool base is provided with a left side core-pulling channel 14 and a right side core-pulling channel 15.

Further, a plurality of fixed molds 20 and a plurality of movable molds 30 are provided, and the plurality of fixed molds 20 and the plurality of movable molds 30 are provided at intervals in a horizontal plane.

Further, each of the fixed molds 20 and the movable molds 30 has two working surfaces, one of which is provided with a first injection molding cavity, and the other of which is provided with a second injection molding cavity.

According to the invention, in the production process, the water channel body and the copper pipe are subjected to one-time injection molding, so that the injection molding of the secondary wrapping part is reduced, the cost is reduced, and the production efficiency is greatly improved. And one-mold multi-cavity production can be realized, so that the production efficiency is further improved.

Example 1

A novel plastic faucet body comprises a left water inlet pipe 1 and a right water inlet pipe 2, wherein a connecting cross-beam 3 is disposed between the left water inlet pipe 1 and the right water inlet pipe 2, a water outlet 31 is disposed in the middle of the connecting cross-beam 3, a left cross-beam of the connecting cross-beam 3 is connected with the left water inlet pipe 1, a left water inlet channel 32 is disposed in the left cross-beam, and the left water inlet channel 32 is communicated with the left water pipe 1. A right cross-beam of the connecting cross-beam is connected with the right water inlet pipe 2, a right water inlet channel is disposed in the right cross-beam, the right water inlet channel is communicated with the right water inlet pipe 2, the left water inlet channel 32 and the right water inlet channel are communicated with the water outlet 31, the left cross-beam is provided with a left core-pulling channel 33 which is coaxially communicated with the left water inlet channel 32, and the right cross-beam is provided with a right core-pulling channel which is coaxially communicated with the right water inlet channel. The left water inlet pipe and the right water inlet pipe are respectively connected with two copper pipes 4 with threads, and the copper pipes 4 are integrally-molded with the novel plastic faucet body; and the copper pipes 4 are respectively communicated with the corresponding left water inlet pipe 1 and the corresponding right water inlet pipe 2.

According to the embodiment, the copper pipes and the faucet water channel body are subjected to one-time injection molding, so that the assembly processes of secondary molding wrapping and related bulk parts are reduced, the cost is reduced, and the production efficiency is greatly improved.

Example 2

On the basis of the first embodiment, the axes of the left water inlet channel 32 and the right water inlet channel are parallel; the axes of the right water inlet pipe 1 and the left water inlet pipe 2 and the water outlet 31 are parallel.

According to this embodiment, the axis of the left water inlet channel 32 and the axis of the right water inlet channel are parallel, and the axis of the left water inlet pipe and the axis of the right water outlet pipe are also parallel, so that the die for molding is simple in structure and convenient for one-mold multi-cavity manufacturing. The production efficiency is improved.

Example 3

On the basis of the first embodiment, the axes of the left water inlet channel 32 and the right water inlet channel are parallel; an angle between the axis of the water outlet 31 and a plane in which the axes of the left and right inlet pipes lie is 45°.

The left water inlet channel 32 of this embodiment is parallel to the axis of the right water inlet channel, which facilitates manufacturing and improves productivity. The angle of a plane formed by the water outlet and the axes of the left water inlet pipe and the right water inlet pipe is 45°, so that the device can be adapted to various occasions.

Example 4

On the basis of the second or third embodiment, each of the left core-pulling channel and the right core-pulling channel is provided with a sealing plug 5 and a sealing ring 6.

According to the sealing method disclosed by the invention, a sealing plug and a sealing ring are adopted, so that the integral sealing performance is improved.

Example 5

A die for molding a novel plastic faucet body comprises a die base, a fixed mold 20, a movable mold 30 and a mold-core installing seat 40, wherein the fixed mold 20, the movable mold 30 and the mold-core installing seat 40 are all disposed in a movable slot 11 of the die base, and the mold-core installing seat 40 is provided with a left water inlet mold core 401, a right water inlet mold core 402 and a water outlet mold core 403. A working surface of the fixed mold 20 is provided with a first injection molding cavity, a working surface of the movable mold 30 is provided with a second injection molding cavity, and the first injection molding cavity and the second injection molding cavity cooperate to form an injection molding cavity, wherein the injection molding cavity comprises a flow passage and a product molding cavity, the left water inlet core 401, the right water inlet core 402 and the water outlet core 403 of the core installing seat 40 are provided within a cavity corresponding to the product molding cavity, the second injection molding cavity is provided with a right side core-pulling hole 301, and the right side core-pulling hole 301 is provided with a left water inlet channel core-pulling rod 12, and the first injection molding cavity is provided with a left side core-pulling hole 201; the left side core-pulling hole 201 is provided with a right water inlet channel core-pulling rod 13, the die base is provided with a left side core-pulling channel 14 and a right side core-pulling channel 15.

In the production process, the fixed molds 20 and the movable molds 30 are folded, a product molding cavity formed by the fixed molds 20 and the movable molds 30 encloses the mold-core installing seat 40, a left water inlet channel core-pulling rod and a right water inlet channel core-pulling rod are inserted into corresponding left and right side core-pulling channels, and are carried out glue injection, pressure maintaining and cooling; the left water inlet channel core-pulling rod and the right water inlet channel core-pulling rod are pulled out along the corresponding left and right side core-pulling channels, and the mold is opened to obtain a corresponding product water channel body which is then sealed using a sealing plug and a sealing ring.

According to the invention, the copper pipes and the faucet water channel body are subjected to one-step injection molding, so that the assembly processes of secondary over molding and related bulk parts are reduced, the cost is reduced, and the production efficiency is greatly improved.

Example 6

On the basis of example 5, a die for molding the novel plastic faucet body comprises a die base, a fixed mold 20, a movable mold 30 and a mold-core installing seat 40, wherein the fixed mold 20, the movable mold 30 and the mold-core installing seat 40 are all disposed in a movable slot 11 of the die base, and the mold-core installing seat 40 is provided with a left water inlet mold core 401, a right water inlet mold core 402 and a water outlet mold core 403; the fixed molds 20 and the movable molds 30 are provided with two working surfaces, one working surface is provided with a first injection molding cavity, and another working surface is provided with a second injection molding cavity, the first injection molding cavity and the second injection molding cavity cooperate to form an injection molding cavity, and the injection molding cavity comprises a flow passage and a product molding cavity, a left water inlet mold core 401, a right water inlet mold core 402 and a water outlet mold core 403 of the mold-core installing seat 40 are sleeved in a cavity corresponding to the product molding cavity, the second injection molding cavity is provided with a right side core-pulling hole 301, and the right side core-pulling hole 301 is provided with a left water inlet channel core-pulling rod 12; the first injection molding cavity is provided with a left side core-pulling hole 201, the left side core-pulling hole 201 is provided with a right water inlet channel core-pulling rod 13, the molding tool base is provided with a left side core-pulling channel 14 and a right side core-pulling channel 15. A plurality of fixed molds 20 and a plurality of movable molds 30 are respectively disposed, and the plurality of fixed molds 20 and the plurality of movable molds 30 are disposed at intervals in a horizontal plane, the fixed molds 20 and the movable molds 30 are respectively provided with two working surfaces, one working surface is provided with a first injection molding cavity, and another working surface is provided with a second injection molding cavity.

According to the embodiment, the fixed molds 20 and the movable molds 30 can be disposed at a plurality of intervals, namely one-mold multi-cavity production, so that the production efficiency is further improved.

While the invention has been particularly shown and described with reference to preferred embodiments thereof, it will be understood by those skilled in the art that various changes in form and details may be made therein without departing from the spirit and scope of the invention.

What is claimed is:

1. A plastic faucet body comprising:
   a left water inlet pipe;
   a right water inlet pipe; and
   a connecting cross-beam disposed between the left water inlet pipe and the right water inlet pipe and provided with a water outlet thereon,
   wherein a left water inlet channel is disposed in a left cross-beam of the connecting cross-beam and communicated with the left water inlet pipe,
   wherein a right cross-beam of the connecting cross-beam being internally provided with a right water inlet channel communicated with the right water inlet pipe,
   wherein the left water inlet channel and the right water inlet channel are communicated with the water outlet,
   wherein another end of the left cross-beam is provided with a left core-pulling channel communicated with the left water inlet channel, and another end of the right cross-beam is provided with a right core-pulling channel communicated with the right water inlet channel,
   wherein a left core-pulling rod is configured to form a left core-pulling channel communicated with the left water inlet channel and a right core-pulling rod is configured to form a right core-pulling channel communicated with the left water inlet channel, and
   wherein each of the left water inlet pipe and the right water inlet pipe is connected with a copper pipe, and the copper pipes are respectively communicated with the corresponding left water inlet pipe and the corresponding right water inlet pipe;
   wherein a distance between each end face of the left core-pulling channel and the right core-pulling channel and the axis of the water outlet are equal to the outer diameter of the water outlet; and
   wherein the left water inlet channel is parallel to the axis of the right water inlet channel, and wherein the connecting cross-beam is z-shaped.

2. The plastic faucet body of claim 1, wherein each of the left core-pulling channel and the right core-pulling channel is provided with a sealing plug and a sealing ring.

3. The plastic faucet body of claim 1, wherein each of the right water inlet pipe and the left water inlet pipe is parallel to the axis of the water outlet.

* * * * *